United States Patent
Gupta et al.

(10) Patent No.: US 11,388,625 B1
(45) Date of Patent: Jul. 12, 2022

(54) CALL OVERLOAD HANDING FOR A PUBLIC SAFETY ANSWERING POINT

(71) Applicant: MOTOROLA SOLUTIONS, INC., Chicago, IL (US)

(72) Inventors: Parveen Gupta, Centennial, CO (US); Janet A Manzanares, Broomfield, CO (US); Min Ma, Lake Zurich, IL (US); Brian J Frommelt, Deer Park, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 94 days.

(21) Appl. No.: 17/128,485

(22) Filed: Dec. 21, 2020

(51) Int. Cl.
| | |
|---|---|
| *H04W 28/02* | (2009.01) |
| *H04W 4/90* | (2018.01) |
| *H04W 4/14* | (2009.01) |

(52) U.S. Cl.
CPC ......... *H04W 28/0289* (2013.01); *H04W 4/14* (2013.01); *H04W 4/90* (2018.02)

(58) Field of Classification Search
CPC ..... H04W 28/0289; H04W 4/90; H04W 4/14; H04W 4/02; H04M 1/72421
See application file for complete search history.

(56) References Cited

U.S. PATENT DOCUMENTS

| | | | |
|---|---|---|---|
| 9,582,985 B2 | 2/2017 | Shurtz | |
| 10,291,777 B1 * | 5/2019 | Luo | H04M 3/5116 |
| 10,630,840 B1 | 4/2020 | Karp et al. | |
| 10,873,845 B1 * | 12/2020 | Hooker | H04W 4/14 |
| 2012/0021715 A1 * | 1/2012 | Tiwari | H04W 4/90 455/404.1 |
| 2018/0310159 A1 * | 10/2018 | Katz | H04M 3/5116 |
| 2020/0162880 A1 * | 5/2020 | Patton | H04W 4/029 |
| 2020/0274962 A1 * | 8/2020 | Martin | H04W 4/90 |
| 2020/0382629 A1 * | 12/2020 | Reagan | G06F 21/31 |

* cited by examiner

*Primary Examiner* — Habte Mered

(57) ABSTRACT

A method for handling an overload state in a public safety answering point (PSAP) is provided. While an overload state is not detected at a call routing computing device received emergency calls are queued for a human operator. Responsive to detecting an overload state, first identifying those calls initiated from mobile devices capable of communicating via text message and transmitting a text message requesting callers to respond via text identifying the matter of the emergency call. The responsive text messages are classified as one of a verified emergency call and a verified non-emergency call to be returned when the overload is no longer detected. For each verified emergency call the call is queued for answer by a human operator. For each verified non-emergency call, a follow up text message is transmitted indicating that the verified non-emergency call will be returned at a later time.

18 Claims, 5 Drawing Sheets

CALL OVERLOAD HANDING FOR A PUBLIC SAFETY ANSWERING POINT

BACKGROUND

A Public Safety Answering Point (PSAP) is a call center where requests from the public for emergency assistance (e.g. police, fire, emergency medical services, etc.) may be handled. For example, in the United States, public safety answering points are normally associated with the 911 system. Other countries may have similar systems (e.g. 999 in the U.K, 112 in the EU, etc.). In addition to handling emergency assistance calls, members of the public often inappropriately use the emergency number, such as 911, to request services that are not emergencies. PSAPs are required to handle all calls regardless of if they are truly emergencies or not.

In order to request emergency assistance, a caller may interact with the PSAP in an ever increasing number of ways. In a traditional wired, landline phone system, the caller may dial the emergency number (e.g. 911) on their traditional Public Switched Telephone System (PSTN) landline phone. Callers may also call via a wired Voice over Internet Protocol (VoIP) system. In such cases, the caller's call is routed via some form of Internet Protocol (IP) network, such as the Internet instead of the PSTN. Calls made via the PSTN and VoIP may be referred to as wired calls, made by wired callers.

In addition to wired calls, the PSAP accepts calls from wireless callers, such as calls made by those using wireless telephone networks (e.g. cellular telephones, etc.). In many cases users of wireless devices (e.g. smartphones, etc.) may have multiple options for communicating with the PSAP. Wireless device users may make traditional voice calls (e.g. dial 911) to speak to an emergency call taker. In the alternative, they may communicate via text messages, such as Short Message Service (SMS) text messages. Communicating via text message may be referred to as "text to 911" in some cases. Calls made by devices that are capable of both voice and text calls may be referred to as wireless calls, made by wireless callers.

Regardless of if the call is wired or wireless that various network will route a call to an emergency number (e.g. 911, etc.) to a PSAP that is most suitable for providing assistance. In many cases, that is the PSAP whose geographic area of coverage includes the caller (e.g. call is routed to the PSAP nearest the caller).

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments

Figure 1:
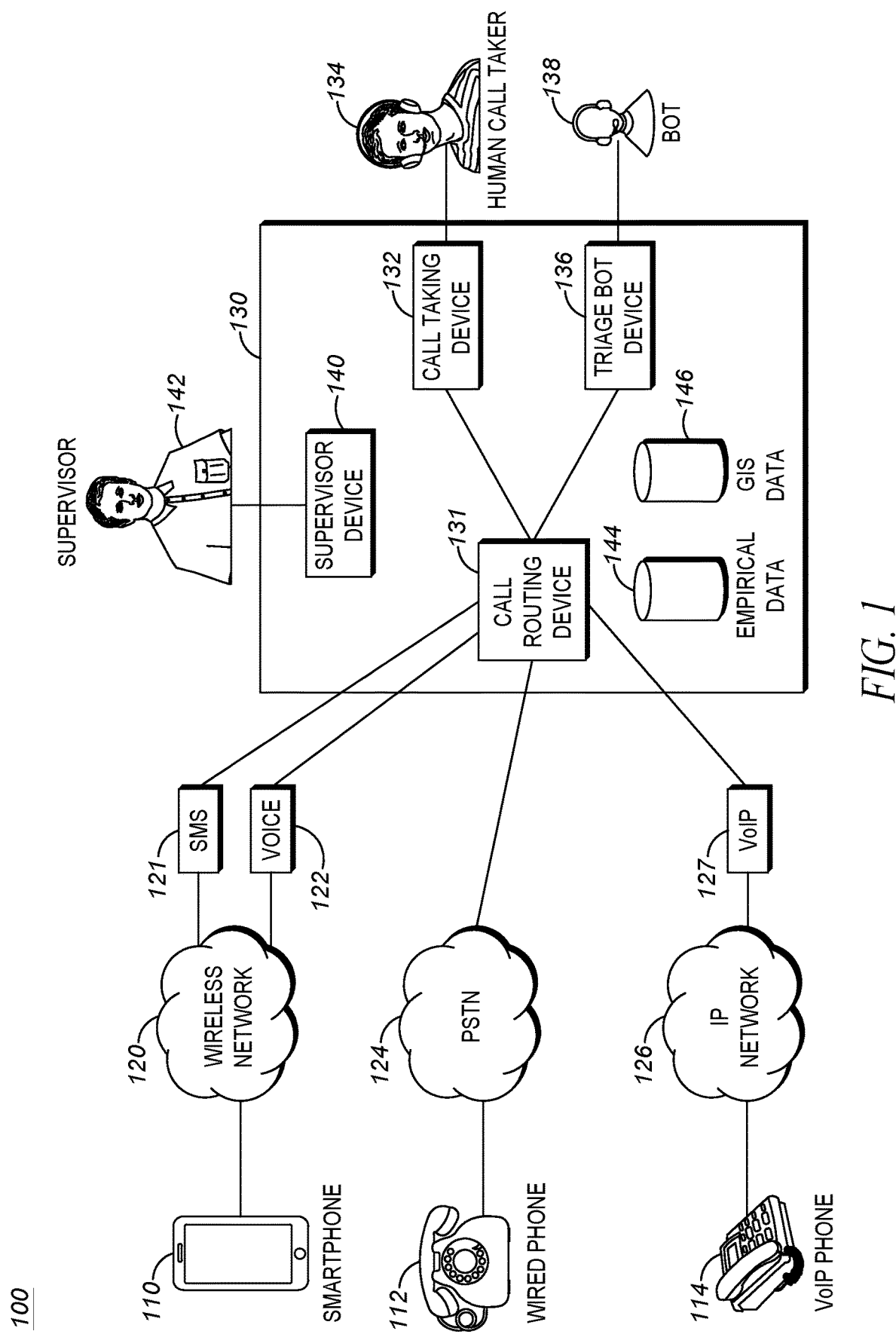
FIG. 1 is an example environment in which the call overload handling for a public safety answering point techniques described herein may be implemented.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

In an ideal situation, every call made to a PSAP, whether it be a wired or wireless call, and regardless of if it is a voice or text call, would be handled by a trained, human, call taker. Unfortunately, reality is often not ideal. There are many reasons why it may not be possible for each and every call to be handled by a human call taker. One common case is when the PSAP is overloaded (e.g. receiving calls at a rate that exceeds the ability of on duty human call takers to process the calls).

Such an overload can occur for many different reasons. A very simple example is that an insufficient number of call takers may be on duty (e.g. call takers taking a sick day, on vacation, etc.). Another example could be a natural disaster event that causes the expected number of PSAP calls to dramatically increase (e.g. flood, forest fire, earthquake, etc.). Another example could be a manmade disaster (e.g. terrorist attack, etc.) that may cause a larger than expected number of calls to the PSAP. In addition, both manmade and natural disasters could have the effect of making it difficult for call takers to arrive at the PSAP, which could result in an insufficient number of call takers on duty. In some cases, a PSAP may be targeted directly (e.g. bomb threat on PSAP, etc.). Although the threat may or may not be real, the PSAP may have to reduce the number of call takers physically allowed in the PSAP building until the threat can be mitigated. Regardless of the reason, there occurs times when the PSAP is not able to have a human call taker answer every incoming call.

A problem arises in that once such an overload condition has been reached, incoming calls must be triaged to determine which ones are routed to a human call taker and which ones are handled by other, automated processing. The triage process must take into account the capabilities of the calling devices and the nature of the emergency (or non-emergency) being reported. The process must also take into account the fact that a caller may hang up the phone (e.g. abandon the call) if a timely response is not received.

The techniques described herein overcome these problems and others, individually and collectively. An automated triage system is provided. Once a PSAP overload condition is detected, emergency callers are triaged based on the capabilities of the device being used to make the emergency call. For ease of description, all calls to the PSAP are generally referred to as emergency calls. All calls may not pertain to actual emergencies. Some calls may be requests for assistance with non-emergency matters. It should be understood that an emergency call indicates a contact with the PSAP, but does not necessarily relate to the severity of what is being called about. Initially, callers contacting the PSAP via text message maybe responded to via a text message provided by an automated system (e.g. a bot). The bot may interact with the caller via text message. The bot may monitor the contents of the text conversation to determine if the call (i.e. the text message) is truly an emergency or not. If the bot can determine the nature of the emergency and that it does not require a complex response, the bot may automatically create an incident and dispatch first responders. If the bot cannot make such a determination, the call may be queued for handling by a human call taker. For the remainder of this description, text messages may also be referred to as calls and the senders of those messages as text message callers. The term call should be understood to mean an interaction with the PSAP and is not intended to imply a voice call.

If the PSAP remains in overload condition after sending text message callers to the bot, the PSAP may then cause some or all wireless callers to be first sent to the bot. For callers using a wireless device to make a voice call to the PSAP, the bot may listen to the voice call using any number of available natural language processing techniques to determine the nature of the emergency. Because the caller is using a wireless device (e.g. text message capable), the bot may respond via a text message or via a text to speech system that outputs the speech onto the voice channel. Just as above, if the bot is able to determine the nature of the incident and if it is not too complex, the bot may automatically create an incident and dispatch first responders. If the bot cannot make such a determination, or the bot determines that a complex response is required, the call may be queued for handling by a human call taker. In addition, the system may determine that certain incident types will always be queued for a human call taker as a matter of policy.

For callers that are calling from wired devices (e.g. devices not capable of receiving text messages) the callers may be put into queue to be handled by human call takers. However, the overload condition may be so great that even after offloading the wireless callers to the bot, the system is still overloaded. If this situation occurs, the PSAP may begin routing wired calls (e.g. made from devices that cannot receive text messages) to the bot. The bot could listen to the voice calls just as it did with voice calls made from wireless callers. The bot could then respond via the voice channel using a text to speech system. Once again, if the bot is able to determine the nature of the incident and it is not too complex, the bot may automatically create an incident and dispatch first responders. If the bot cannot make such a determination, the call may be queued for handling by a human call taker.

The PSAP being in an overload condition can also cause an increase in the number of callers who abandon their call because it is taking too long for someone to answer their call. In many cases, the caller hangs up, and then immediately calls again, thus creating a storm of abandoned calls. Most PSAPs are required to follow up on all abandoned calls to ensure there was not an emergency. The techniques described herein determine the type of emergency call (e.g. wireless or wired). For abandoned calls that were made from a wireless device (e.g. a device that can receive text messages) the follow up to the abandoned call (e.g. "did you just try to call 911 with a real emergency?") may be sent immediately via text message, regardless of if the original call was a text call or a voice call.

For abandoned calls made via a wired device, the follow up may be placed in a human call taker queue if possible. However, if the human call taker queue is sufficiently overloaded, the bot may call with a prerecorded message and replies via voice. The bot could then continue to listen to the caller just as above in the case where the bot responds when the human call taker queue remains overloaded to the point where the bot begins handling calls from wired callers.

What should be understood is that there are multiple levels of overload processing/deferring callers to a bot. For example, once an initial level of overload is reached, abandoned call processing may be passed to the bot. If this is not enough to bring the overload to an acceptable level, text calls may then be shifted to bot processing. If this is still not enough to bring the overload to an acceptable level, callers that are capable of receiving text messages, but who initially made voice calls, may be shifted to the bot processing. Finally, if that step does not bring the overload to within acceptable levels, wired callers may then be shifted to bot processing. It should be further understood that as the overload level decreases, calls may be shifted away from the bot and back to human call takers in reverse of the process described above.

A method for handling an overload state in a public safety answering point (PSAP) is provided. The method includes while an overload state is not detected at a call routing computing device, queueing, by the call routing computing device, received emergency calls for answer by human operators at call taking electronic computing devices. The method further includes responsive to detecting, by the call routing computing device, the overload state as a function of one or more of electronically detected incoming emergency call volume, incident volume, and electronically determined available call taking staff, first identifying, by the call routing computing device, those queued emergency calls initiated from mobile devices capable of communicating via text message and, for those identified queued emergency calls, transmitting a text message requesting callers that initiated the call from the mobile devices capable of communicating via text message to respond via responsive text message identifying the public safety subject matter of the emergency call. The method also includes processing, by the call routing computing device, one or more received responsive text messages and classifying each responsive text message and its associated queued emergency call, as a function of the identified public safety subject matter, as one of a verified emergency call that should continue to queue for a human operator at a call taking electronic computing device and a verified non-emergency call that can be returned when the overload state is no longer detected. The method also includes for each verified emergency call, continuing to queue, by the call routing computing device, each verified emergency call for answer by a human operator at a call taking electronic computing device. The method also includes for each verified non-emergency call, causing a follow-up text message to be transmitted to each verified non-emergency call indicating that the verified non-emergency call has been, is being, or will be disconnected and returned at a later time, and subsequently terminating, by the call routing computing device, the verified non-emergency call.

In one aspect of the method, the follow-up text message includes, as a function of one or both of electronically detected incoming emergency call volume and electronically determined available call taking staff, an estimated time that the verified non-emergency call will be returned. In one aspect, the method further comprising detecting, by the call routing computing device, that the overload state has ended, and responsively refraining from transmitting further text messages to subsequently received new emergency calls.

In one aspect of the method, the call routing computing device first identifies those queued emergency calls initiated from mobile devices that have initiated the emergency call via text message, and only after one of i) determining that a number of the mobile devices that have initiated the emergency call via text message would be insufficient to resolve the overload state and ii) classifying those queued emergency calls initiated from mobile devices that have initiated the emergency call via text message as verified emergency and non-emergency calls and determining that a number of verified non-emergency calls from mobile devices that have initiated the emergency call via text message would be insufficient to resolve the overload state, proceeding to identify those queued emergency calls initiated from mobile devices that have initiated the emergency call via voice but have a determined capability to support text message.

In one aspect of the method, a caller identifier of the text message is set to identify a jurisdiction of the PSAP and identify a source of the message as a PSAP. In one aspect of the method, verified emergency calls are identified via the identified subject matter as including keywords associated with life-threatening calls and non-emergency calls are identified via the identified subject matter as including keywords associated with non-life-threatening calls. In one aspect, the verified emergency call is answered by the human operator at the call taking electronic computing device, the identified subject matter of the call is provided to the human operator via the call taking electronic computing device.

In one aspect, the method further includes providing, to a supervisory dashboard computing device, the identified subject matter of each verified non-emergency call for display to a supervisor. In one aspect, the method further includes for each mobile device that has initiated the emergency call via voice but has a determined capability to support text messaging, providing, via the voice link, an audio instruction to keep holding for a human operator while the text message is transmitted. In one aspect, the method further includes for those verified emergency calls, transmitting a second text message indicating that a human operator will be available shortly, and requesting additional information as a function of the responsive text message. In one aspect, the method further includes storing metadata for each terminated non-emergency call, and responsive to detecting that the overload state has passed, routing the metadata to a human operator at a call taking electronic computing device for callback.

A call routing computing device for handling an overload state in a public safety answering point (PSAP) is provided. The call routing computing device comprises a processor and a memory coupled to the processor, the memory containing a set of instructions thereon that when executed by the processor cause the processor to while an overload state is not detected at the call routing computing device, queue, by the call routing computing device, received emergency calls for answer by human operators at call taking electronic computing devices. The instructions further cause the processor to, responsive to detecting, by the call routing computing device, the overload state as a function of one or more of electronically detected incoming emergency call volume, incident volume, and electronically determined available call taking staff, first identify, by the call routing computing device, those queued emergency calls initiated from mobile devices capable of communicating via text message and, for those identified queued emergency calls, transmit a text message requesting callers that initiated the call from the mobile devices capable of communicating via text message to respond via responsive text message identifying the public safety subject matter of the emergency call. The instructions further cause the processor to process, by the call routing computing device, one or more received responsive text messages and classifying each responsive text message and its associated queued emergency call, as a function of the identified public safety subject matter, as one of a verified emergency call that should continue to queue for a human operator at a call taking electronic computing device and a verified non-emergency call that can be returned when the overload state is no longer detected. The instructions further cause the processor to for each verified emergency call, continue to queue, by the call routing computing device, each verified emergency call for answer by a human operator at a call taking electronic computing device. The instructions further cause the processor to for each verified non-emergency call, cause a follow-up text message to be transmitted to each verified non-emergency call indicating that the verified non-emergency call has been, is being, or will be disconnected and returned at a later time, and subsequently terminate, by the call routing computing device, the verified non-emergency call.

In one aspect, the follow-up text message includes, as a function of one or both of electronically detected incoming emergency call volume and electronically determined available call taking staff, an estimated time that the verified non-emergency call will be returned. In one aspect, the instructions further comprise instructions to detect, by the call routing computing device, that the overload state has ended, and responsively refraining from transmitting further text messages to subsequently received new emergency calls.

In one aspect, the call routing computing device further comprises instructions to first identify those queued emergency calls initiated from mobile devices that have initiated the emergency call via text message, and only after one of i) determining that a number of the mobile devices that have initiated the emergency call via text message would be insufficient to resolve the overload state and ii) classifying those queued emergency calls initiated from mobile devices that have initiated the emergency call via text message as verified emergency and non-emergency calls and determining that a number of verified non-emergency calls from mobile devices that have initiated the emergency call via text message would be insufficient to resolve the overload state, proceed to identify those queued emergency calls initiated from mobile devices that have initiated the emergency call via voice but have a determined capability to support text message. In one aspect, verified emergency calls are identified via the identified subject matter as including keywords associated with life-threatening calls and non-emergency calls are identified via the identified subject matter as including keywords associated with non-life-threatening calls.

A non-transitory processor readable medium containing a set of instructions thereon is provided. When executed by a processor of a call routing computing device the instructions cause the processor to, while an overload state is not detected at the call routing computing device, queue, by the call routing computing device, received emergency calls for answer by human operators at call taking electronic computing devices. The instructions further cause the processor to, responsive to detecting, by the call routing computing device, the overload state as a function of one or more of electronically detected incoming emergency call volume, incident volume, and electronically determined available call taking staff, first identify, by the call routing computing device, those queued emergency calls initiated from mobile devices capable of communicating via text message and, for those identified queued emergency calls, transmit a text message requesting callers that initiated the call from the mobile devices capable of communicating via text message to respond via responsive text message identifying the public safety subject matter of the emergency call. The instructions further cause the processor to process, by the call routing computing device, one or more received responsive text messages and classifying each responsive text message and its associated queued emergency call, as a function of the identified public safety subject matter, as one of a verified emergency call that should continue to queue for a human operator at a call taking electronic computing device and a verified non-emergency call that can be returned when the overload state is no longer detected. The instructions further cause the processor to for each verified emergency call, continue to queue, by the call routing computing device, each verified emergency call for answer by a human operator at a call taking electronic computing device. The instructions further cause the processor to for each verified non-emergency call, cause a follow-up text message to be transmitted to each verified non-emergency call indicating that the verified non-emergency call has been, is being, or will be disconnected and returned at a later time, and subsequently terminate, by the call routing computing device, the verified non-emergency call.

In one aspect, the follow-up text message includes, as a function of one or both of electronically detected incoming emergency call volume and electronically determined available call taking staff, an estimated time that the verified non-emergency call will be returned. In one aspect, the instructions on the medium further comprise instructions to detect, by the call routing computing device, that the overload state has ended, and responsively refraining from transmitting further text messages to subsequently received new emergency calls.

In one aspect, the medium further comprises instructions to first identify those queued emergency calls initiated from mobile devices that have initiated the emergency call via text message, and only after one of i) determining that a number of the mobile devices that have initiated the emergency call via text message would be insufficient to resolve the overload state and ii) classifying those queued emergency calls initiated from mobile devices that have initiated the emergency call via text message as verified emergency and non-emergency calls and determining that a number of verified non-emergency calls from mobile devices that have initiated the emergency call via text message would be insufficient to resolve the overload state, proceed to identify those queued emergency calls initiated from mobile devices that have initiated the emergency call via voice but have a determined capability to support text message.

Further advantages and features consistent with this disclosure will be set forth in the following detailed description, with reference to the figures.

FIG. 1 is an example environment 100 in which the call overload handling for a public safety answering point techniques described herein may be implemented. Environment 100 includes several different types of callers 110, 112, 114 that may make calls to a Public Safety Answering Point (PSAP) 130.

A caller may make a call to the PSAP using a wireless device 110, such as a smartphone. A wireless caller may utilize a wireless network 120 to route the call. Wireless networks, for example, may be networks provided by cellular telephone network operators (e.g. $3^{rd}$ generation networks, $4^{th}$ generation Long Term Evolution (LTE) networks, $5^{th}$ generation networks, etc.). Although wireless networks may provide connectivity to wireless devices, it should be understood that this is not intended to imply that the network itself is entirely wireless. Wireless networks may also include significant portions that are wired.

For purposes of this description, there can generally be two types of calls made from wireless devices 110. The first type of call is a voice call. The second type of call is a Short Message Service (SMS) call, which is often referred to as a text message. A SMS call may be routed through a SMS system 121. A voice call may be routed through a voice system 122. What should be understood is that wireless devices are able to make both voice calls and text calls to the PSAP. Any device that is capable of making and receiving both voice and text calls to a PSAP 130 will be referred to as a wireless device. Calls from those devices may be referred to as wireless calls.

Environment 100 may also include a wired phone 112 that may be used to make wired calls to the PSAP 130. For example, a wired phone may use the Public Switched Telephone Network (PSTN) 124 to make a wired call to the PSAP. The PSTN generally only includes the ability to make voice calls. Thus, calls routed through the PSTN are not able to use text messages. Another type of wired phone may be a Voice over Internet Protocol (VoIP) phone 114. A VoIP phone may make a call to the PSAP using a IP network 126 (e.g. IP based network) vs the switched nature of the PSTN. A VoIP call may make use of a VoIP system 127 to make voice calls. Just as above, a VoIP phone may not have the ability to send text messages.

For purpose of this description, it should be understood that there are two types of calling devices and calls. Wireless devices are those devices that are able to make and receive both voice and text calls. Wired devices are those devices that are only able to make and receive voice calls. It should be understood that the wireless network 120, the PSTN 124, and the IP network 126 may include both wired and wireless portions. However, for purposes of this description the actual transport mechanism within those networks is irrelevant.

Environment 100 may also include PSAP 130. The PSAP may be a call center where calls requesting emergency (and in some cases non-emergency) services are received. For example, calls to 911 made from smartphone 110, wired phone 112, and VoIP phone 114 may be routed to the PSAP via networks 120, 125 and 126 respectively.

PSAP 130 may include a call routing device 131, which may also be referred to as a call routing computing device. An example of a device that may implement the call routing device is described with respect to FIG. 4. The call routing device may receive all incoming calls. The call routing device is able to determine if the call comes from a wireless device (e.g. capable of text messaging) or a wired device (e.g. not capable of text messaging). The call routing device is also able to determine the level of overload of the PSAP. The call routing device makes decisions on how to route calls based on the calling device type as well as the overload status of the PSAP.

PSAP 130 may also include a call taking device 132, which may also be referred to as a call taking computing device. An example of a device that may implement the call routing device is described with respect to FIG. 4. The call taking device is typically a computer workstation where a human call taker 134 may receive emergency voice calls and/or text messages. The call taking device will typically include one or more monitors and input devices that allows a call taker to capture information related to the emergency that is being reported. In some cases, the call taker may also act as a dispatcher and dispatches first responders (e.g. police, fire, EMS, etc.) as necessary to handle any requests for assistance.

As such, call taking device 132 may also provide capabilities associated with a dispatch process. Such capabilities may include pre-planned responses for identified incidents, lists of available first responders, etc. What should be understood is that human call taker 134 may receive incoming calls to PSAP 130 and process them via the call taking device, regardless of if they are voice or text calls.

PSAP 130 may also include triage bot device 136, which may also be referred to as a triage bot computing device. An example of a device that may implement the triage bot device is described with respect to FIG. 4. The triage bot device may implement a bot 138 application that may be utilized to answer calls incoming into the PSAP 130. The bot may also be used for abandoned call handling, as will be described in further detail with respect to FIG. 2.

PSAP 130 may also include a supervisor device 140, which may also be referred to as a supervisor computing device. An example of a device that may implement the supervisor device is described with respect to FIG. 4. The supervisor device may allow a human supervisor 142 to monitor aspects of the PSAP (e.g. overload level, etc.) to allow the supervisor to manually initiate the techniques described herein. As will be explained in further detail below, the human supervisor in some cases may review actions taken by the bot 138 and either approve or reject those actions.

PSAP 130 may also include empirical data 144, which may be a data store that holds empirical data that may be used by the bot 138 when determining if a request for assistance is complex/ambiguous or simple/routine, which may be used to determine if the bot can automatically respond to the request. Similarly, the PSAP may include Geographic Information Services (GIS) data 146 that may be a data store that holds geographic information used to determine the automatic response of the bot. Operation of these two data stores will be described in further detail with respect to FIG. 2.

In operation, call routing device 131 may monitor the overall status of PSAP 130 to determine if the PSAP is in an overload condition. If not, calls are routed to human call takers 134 via call taking device 132. If the PSAP 130 is in some level of overload, which may be determined automatically by the call routing device or via manual intervention from the supervisor 142 using supervisor device 140, the call routing device may route some and/or all calls to the bot 138 implemented on the triage bot device 136. The decision on how to route the calls may be based on if the call was received from a wired or wireless device. A more detailed description of the operation of environment 100 is presented below with respect to FIG. 2.

Figure 2:
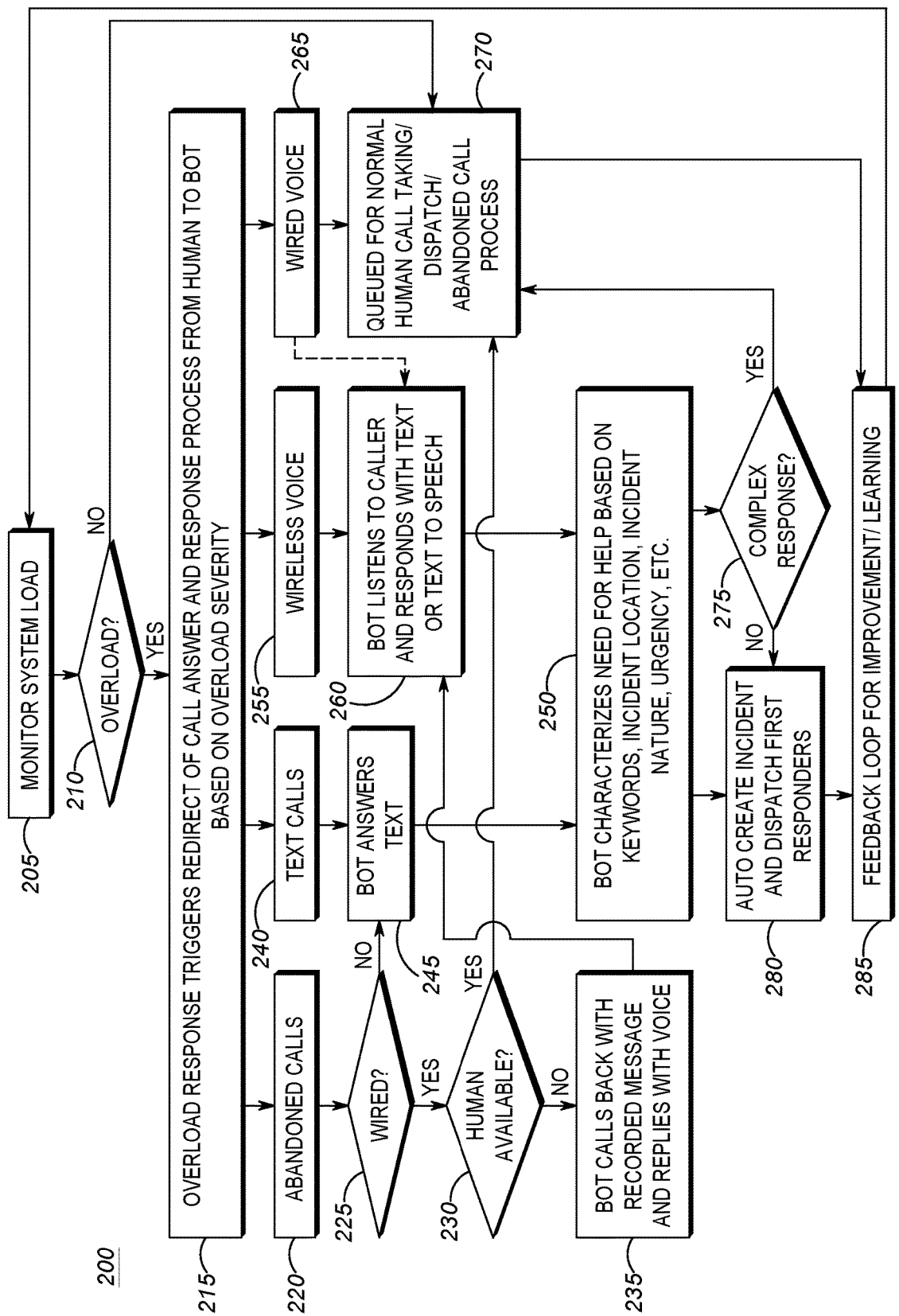
FIG. 2 is an example of a flow diagram for implementing the call overload handling techniques described herein.

FIG. 2 is an example of a flow diagram for implementing the call overload handling techniques described herein. The flow diagram 200 depicted in FIG. 2 is one example of operations of environment 100 depicted in FIG. 1. In block 205, the system load may be monitored. The system may be monitored to determine if an excessive number of calls are arriving at the PSAP. For example, is a large incident/disaster/natural disaster is occurring, the number of incoming calls may overwhelm human call takers with a high call volume. The determination of overload may be based on call queue depth, average waiting times, average call on hold time, etc. The techniques described herein are not dependent on any particular technique for detecting that the PSAP is overloaded.

As another example, the system load may be excessive due to staffing shortages (e.g. staffing shortages due to staff unavailability from pandemics, natural disasters, threats/attacks on the PSAP (e.g. terrorist attack/bomb threat/biologic threat), department budget issues, or any number of other reasons). The staff shortage may even be role specific (e.g. not enough call takers, but sufficient number of dispatchers, etc.). It should be understood that the system detects when there are not enough human resources to process incoming calls. The specific reasons for why there are not enough human resources is generally unimportant. What should be understood is that the system, for example the call routing device 131, determines if an overload condition is or is not occurring.

It should further be understood that an overload condition may be manually set by the PSAP (e.g. supervisor, etc.). For some reason, the supervisor may determine that the overload procedures should be in effect. For example, during a potential threat (e.g. bomb scare), call takers may need to evacuate the building while the threat is addressed. It is possible that no emergency calls are being received at that time. The supervisor may preemptively activate the overload processing mechanism to ensure that if calls begin to be received, they will be handled as if human call takers are not available. This may allow a supervisor to address an overload condition before the system detects it. j In block 210, if it is determined that there is no overload condition, the process moves to block 270. In block 270, an incoming call to the PSAP is added to the queue for normal human call taking/dispatch/abandoned call processing. In other words, the call will be handled by a human operator and go through the process that occurs when the system is not in overload. As will be explained in further detail below, there are cases where the bot cannot process an incoming call and those calls will also be added to the queue for normal human processing. For purposes of this description, normal human processing is call handling that does not involve the bot.

If it is determined in block 210 that the system is in overload, the process moves to block 215. In block 215, overload response triggers redirect of call answer and response process from human to bot based on overload severity. What should be understood is that shifting from a human to a bot answering incoming calls during time of overload may be a gradual process depending on how severe the level of overload is.

For example, PSAPs are generally required to follow up on all calls received, even if the caller hangs up before the call is answered. These calls may be referred to as abandoned calls. During normal operations, a call taker may have a queue of abandoned calls that need to be followed up on. As should be clear, following up on abandoned calls may be of a lower priority than answering new calls. If the call routing device detects that the PSAP is beginning to be overloaded, the first step may be to attempt to shift abandoned call handling from human call takers to the bot.

In block 220, it may have been determined that the bot will attempt to handle abandoned calls. In block 225 it may be determined if the call came from a wired caller. It is estimated that a large percentage of calls to a PSAP come from wireless callers. The ability to respond via text significantly improves the efficiency in responding to abandoned calls. As explained above, wired callers are not capable of receiving text messages. If the call did not come from a wired caller (e.g. the calling device is capable of receiving a text message), the bot may send a text message to the caller who abandoned the call (e.g. hung up before call was answered) asking if the caller actually has an emergency and the nature of that emergency. The process then moves to block 245, which is described in further detail below. What should be understood is that if the caller is able to receive a text message, the message is sent from the bot, thus reducing the amount of load on the human call takers in following up on abandoned calls.

If the call came from a wired caller, the process moves to block 230. In block 230, it may be determined if a human is available to follow up on the abandoned call. For example, if the system is no longer in overload (e.g. humans are again available to follow up on abandoned calls), the process moves to block 270, wherein the follow up to the abandoned call is placed in the queue for processing by a human. In some cases, it may be determined that the human is no longer available to process a call in the abandoned call queue. In such cases, the process may return to block 230.

If no human is available, the process moves to block 235. In block 235, the bot calls the caller back with a recorded messages and replies to the caller using voice (e.g. speech). The recorded message may be an actual recording or may be speech produced by a text to speech converter. The reason for this is because since this call came from a wired device, an audio message is all that can be received by the wired device. The content of the message may be similar to that which was described above (e.g. is this a real emergency, what is the nature of the emergency, etc.). The process may then move to block 260 which is described in further detail below.

At the next level of overload, the system may determine that text based calls 240 to the PSAP will be handled by the bot. Because the calls are text based, they came from wireless devise, which are clearly able to receive text messages. In block 245 the bot answers the text message by asking questions. For example, the bot may ask for information related to the incident that is being reported (e.g. location, incident type (e.g. fire, assault, etc.), and the type of assistance being requested (e.g. police, fire, EMS).

There are a number of currently available techniques for utilizing text based messages to gather data related to public safety incidents. The techniques described herein can make use of any of those techniques. What should be understood is that the bot, via text solicits information about the call from the caller via text message. As explained above, the same processing can occur during the abandoned call handling process. Once a user has responded to the text, the call can be processed just as if the user had initially made his call as a text based call. The process then moves to block 250, which is described in further detail below.

At the next level of overload, the system may determine that wireless voice 255 calls should be handled by the bot. As explained above, wireless devices may make both voice and text calls to the PSAP. If a wireless caller makes a voice call to the PSAP, the process moves to block 260. In block 260, the bot listens to the caller and responds. The response could either be a text response (because the device is capable of receiving text messages) or could be a voice response (e.g. text to speech conversion). The bot may gather information related to the incident by asking questions related to the incident, similar to those described with respect to block 245. What should be understood is that the bot gathers incident related information from the caller.

In block 250, the bot characterizes the need for help based on keywords, incident locations, incident nature, urgency, etc. For example, using natural language processing, the bot may determine the nature of the incident (e.g. fire, fight, heart attack, etc.) based on words used in the interaction with the caller. For example, if the caller types/says, "there is a bar fight at 123 main street" the bot may determine that this is a call related to violence based on the fight keyword, and that a police response is warranted based on the nature of the incident (e.g. violence). Likewise, reference to a heart attack could allow the bot to determine that the incident is health related and that EMS should be sent. Furthermore, the presence of an address means that the hot is able to determine where resources should be dispatched.

In block 275 it may be determined if the response is complex and/or ambiguous. A complex response may be a response where the bot is not able to determine the proper response to the incident. For example, if the caller has not provided an incident location or the incident location is ambiguous, the hot will not know where to dispatch first responders. As another example, the response may be complex if the bot is unable to associate what the caller typed/said with any keywords indicating a particular type of incident. For example, the bot cannot determine if a police or EMS response should be sent. In such a case, rather than risking an incorrect response, the hot may redirect the call to the human call taker queue by adding the call to the human call taker queue as described in block 270.

If it is determined in block 275 that the response is simple and/or routine (e.g. bot is able to determine the type of incident, and the standard response for that type of incident is known), the process moves to block 280. For example, if the hot is able to determine that the incident is a bar fight at a specific location, the standard response may be to send a primary and backup police officer to the location. In block 280, the bot may auto create an incident in a computer aided dispatch (CAD) system and automatically dispatch the necessary first responders to the incident location.

At the next level of overload, the system may determine that even wired voice calls (e.g. those not capable of receiving text messages) 265 may also need to be processed by the bot. In normal operation, it would be desired that voice calls made over wired devices are handled by a human if at all possible, as shown in block 270. However, in some cases, the system may be so overloaded that it is necessary to direct calls from wired devices to the bot. In such cases, the process moves to block 260, as shown via the dashed line. The bot may then interact with the caller via speech to gather the incident related details. As above, if sufficient details can be obtained in block 250, the bot may auto create an incident and automatically dispatch first responders. If sufficient details cannot be obtained, the process moves to block 270 where the call is placed in queue for normal human call taker processing.

Regardless of how processed, the process moves to block 285 which is a feedback loop for improvement/learning. Throughout the process described in FIG. 2, the bot is making decisions based on empirical data 144 and geographic information data 146. For example, determine the proper incident type based on keywords. The bot is also making decisions on responses that may be based on previous responses to incidents of that type. Determine locations based on processing the input from the caller is also determined.

The bot may not always make accurate determinations. There can be a feedback loop wherein the bot receives information on if its determinations were correct or not, and if not, what the subsequent corrective action was. The bot can include this information in the data stores to learn from previous responses. Learning from this type of feedback is well known in the field of machine learning. Any techniques for bot training based on feedback techniques would be applicable for use with the techniques described herein.

Although not shown, it should be understood that a human user (e.g. supervisor, etc.) may intervene at any step where the bot is taking action and override the bot's selected action. For example, in the case of a sever overload, a supervisor may monitor the actions taken by the bot. If the actions are wrong, the supervisor may correct, in real time, the action. For example, a caller may report a man with a broken arm who is being attacked. The bot may incorrectly determine that this is a medical call rather than a violence call, and dispatch EMS. A supervisor overseeing this process may override the bot and provide the proper assessment (e.g. violence related call, dispatch police). Cases where the supervisor intervenes and alters the bot response may be fed back via the feedback loop in block 285.

It should be noted that as the level of overload of the PSAP falls, the process may proceed in reverse. For example, as the level of overload falls, text and wireless calls may be returned to human processing, while abandoned call handling remains with the bot. Once the overload level has fallen below the point where the PSAP is in overload, all call handling, including abandoned call handling, may be returned to human call takers.

Figure 3A:
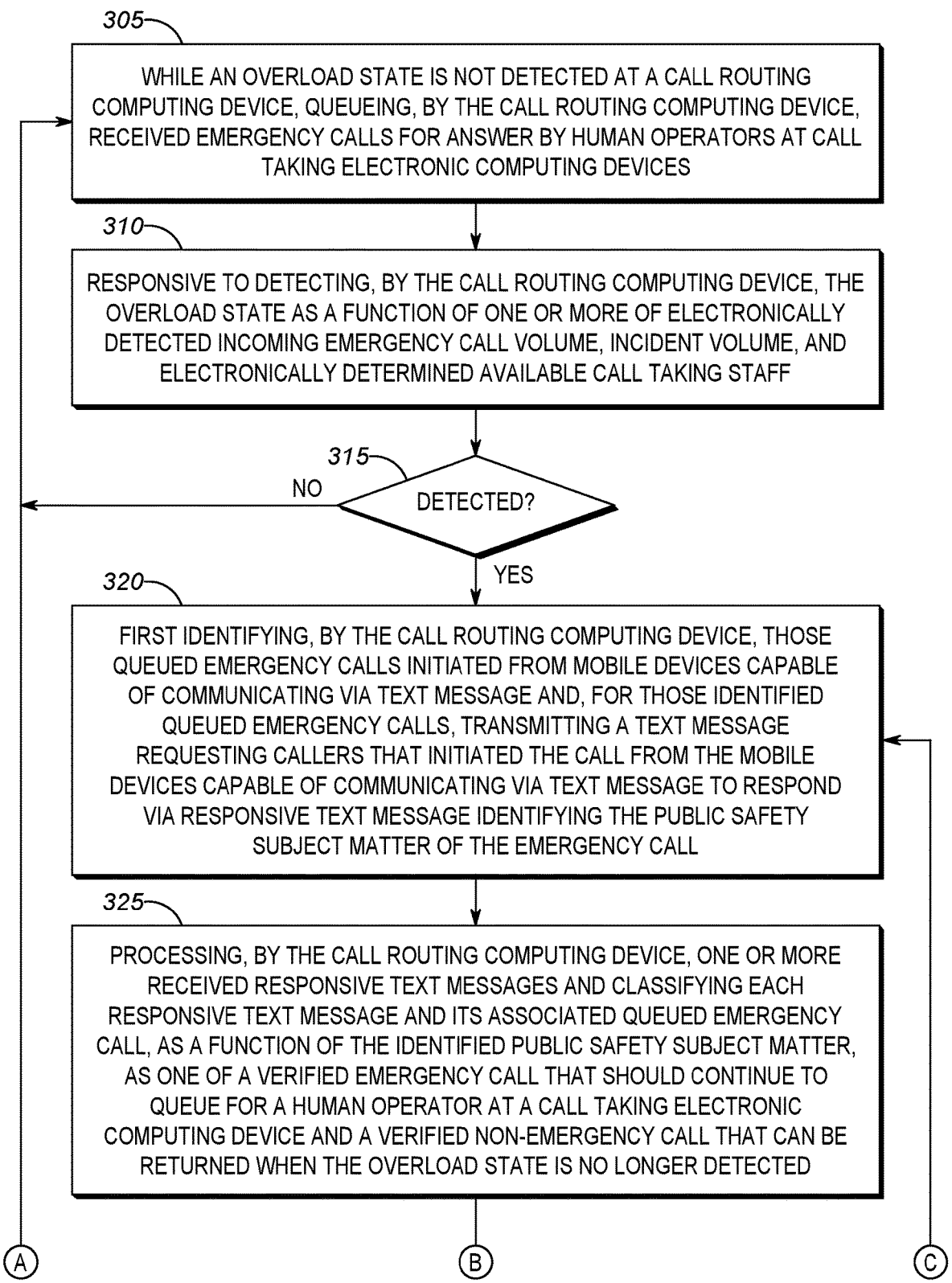
FIGS. 3A and 3B are another example of a flow diagram for implementing the call overload handling techniques described herein.
Figure 3B:
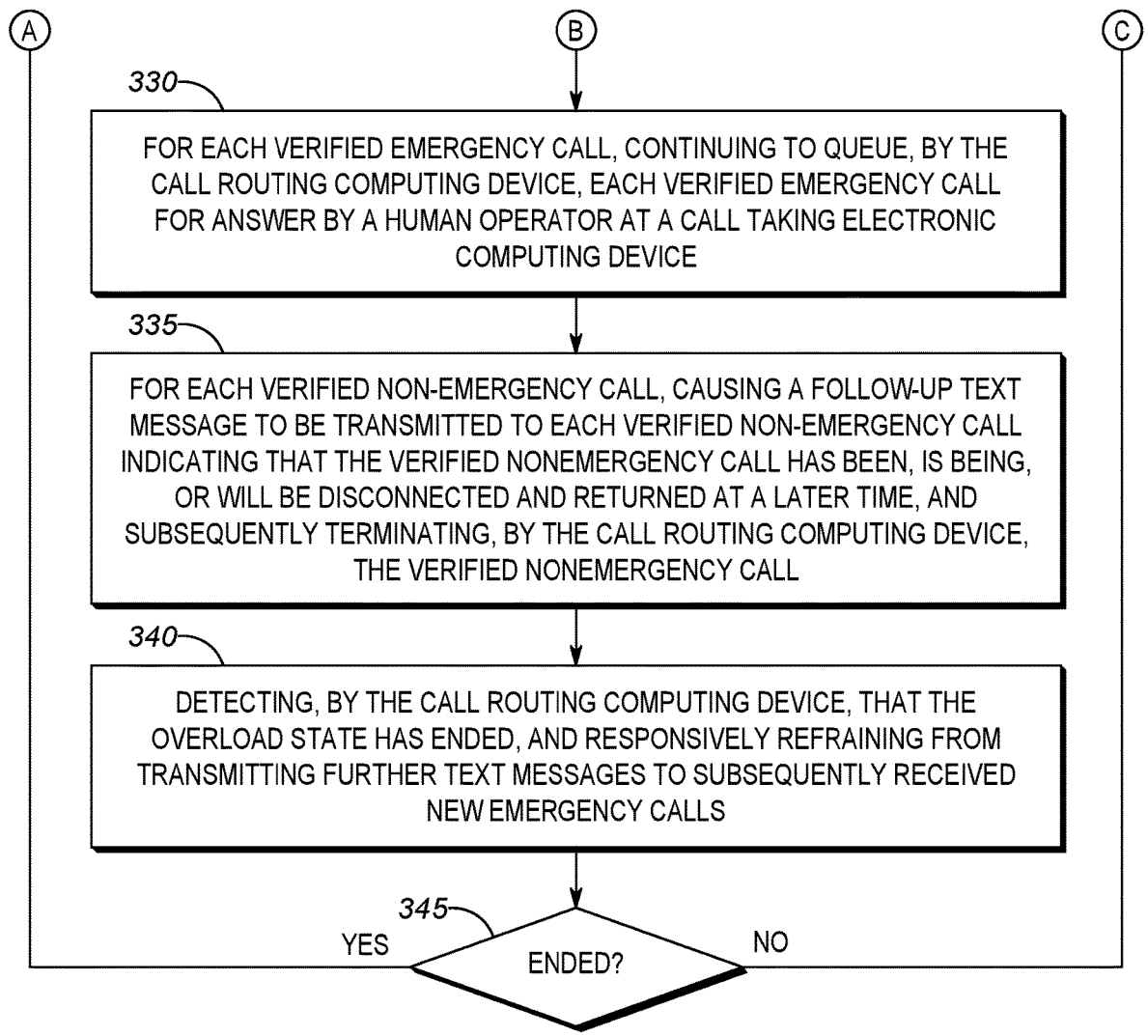

FIGS. 3A and 3B are another example of a flow diagram 300 for implementing the call overload handling techniques described herein. In block 305, while an overload state is not detected at a call routing computing device, queueing, by the call routing computing device, received emergency calls for answer by human operators at call taking electronic computing devices. In other words, when the PSAP is not in an overload state, all calls received are queued for processing by a human operator. As mentioned above, the ideal situation is that all incoming calls, regardless of if they are coming from wired or wireless devices and regardless of if they are emergency calls or not, will be handled by human call takers.

In block 310, the call routing computing device detects the overload state as a function of one or more of electronically detected incoming emergency call volume, incident volume, and electronically determined available call taking staff. AS described above, the determination of the PSAP being in an overload state is dependent on any number of factors, such as staffing levels, call volume, wait times, etc. The particular criteria for detecting that an overload condition has occurred may be configured by PSAP personnel. Furthermore, the declaration of an overload condition could also come from a manual indication by a supervisor. In block 315, responsive to if an overload condition is not detected, the process returns to block 305 where calls are queued for human call takers.

If in block 315, responsive to an overload condition being detected, the process moves to block 320. In block 320, the call routing computing device first identifies those queued emergency calls initiated from mobile devices capable of communicating via text message and, for those identified queued emergency calls, transmitting a text message requesting callers that initiated the call from the mobile devices capable of communicating via text message to respond via responsive text message identifying the public safety subject matter of the emergency call.

In other words, if the emergency caller is calling from a wireless device (e.g. a device capable of text communication) and the emergency call was sent as a text call, the system responds with a text message (e.g. from the bot). At this level of overload handling, emergency calls initiated by text message are responded to by text message. The responsive text message may solicit additional incident related information. The bot may then analyze the content of the responsive text message to determine the nature of the incident and the type of response that may be required.

For each mobile device that has initiated the emergency call via voice but has a determined capability to support text messaging, an audio instruction to keep holding for a human operator while the text message is transmitted may be provided, via the voice link. In other words, a caller making a voice call from a wireless (e.g. text capable) device may receive a text message soliciting additional information. At the same time, the voice channel of the call may play audio instructing the caller to stay on the line for a human call taker.

In some overload conditions, the call routing computing device first identifies those queued emergency calls initiated from mobile devices that have initiated the emergency call via text message, and only after one of i) determining that a number of the mobile devices that have initiated the emergency call via text message would be insufficient to resolve the overload state and ii) classifying those queued emergency calls initiated from mobile devices that have initiated the emergency call via text message as verified emergency and non-emergency calls and determining that a number of verified non-emergency calls from mobile devices that have initiated the emergency call via text message would be insufficient to resolve the overload state, proceeding to identify those queued emergency calls initiated from mobile devices that have initiated the emergency call via voice but have a determined capability to support text message.

In other words, the call routing computing device may determine if the overload processing would be insufficient to resolve the overload condition. For example, it is determined if all the calls that were made via text message were not queued to a human call taker, but were instead handled by the bot, would that resolve the overload condition. As another example, it is determined if, after all calls are classified as emergency and non-emergency calls, routing all non-emergency calls to the bot would still not result in resolving the overload condition. If either of these conditions are true, the queued emergency calls from mobile devices (e.g. wireless devices capable of receiving text messages) that were initiated via voice are identified. Those calls may then be responded to via text, as the devices are capable of receiving text messages.

In block 325, the call routing computing device may process the one or more received responsive text messages and classify each responsive text message and its associated queued emergency call, as a function of the identified public safety subject matter, as one of a verified emergency call that should continue to queue for a human operator at a call taking electronic computing device and a verified non-emergency call that can be returned when the overload state is no longer detected. For example, in some implementations, if a text based call to the PSAP is determined, based on analyzing the call to be a non-emergency call that does not require immediate attention, the call can be queued for later return by a human call taker. Because the call is a non-emergency call, there is no pressing need for the call to be handled immediately, and can be processed once the PSAP is no longer in an overload state.

In some implementations, verified emergency calls are identified via the identified subject matter as including keywords associated with life-threatening calls and non-emergency calls are identified via the identified subject matter as including keywords associated with non-life-threatening calls. For example, calls including key words such as heart attack, fire, gunshots, etc. may be classified as emergency calls due to the potential for loss of life. Meanwhile, calls including key words such as dog barking, parking violation, etc. may be classified as non-emergency calls, as there is no risk of loss of life due to a delayed response to those types of calls.

Furthermore, if the responsive text indicates that a complex response will be needed that is beyond the ability of the bot to handle, the call may be sent to the human call taker queue for processing by a human. When the verified emergency call is answered by the human operator at the call taking electronic computing device, the identified subject matter of the call is provided to the human operator via the call taking electronic computing device. In other words, when the human call taker begins processing the call, all information previously communicated to the caller via text is displayed to the human call taker, in order for the human call taker to understand what has previously occurred. It should be understood that the same process occurs when a human call taker later returns a non-emergency call (e.g. all messages sent via text are displayed to the human call taker).

In block 330, for each verified emergency call, continuing to queue, by the call routing computing device, each verified emergency call for answer by a human operator at a call taking electronic computing device. In other words, if the hot cannot handle the emergency call due to the complex nature of the emergency call, it remains queued for handling by a human operator.

Although the call remains queued for processing by a human call taker, in some implementations, for those verified emergency calls, a second text message is transmitted indicating that a human operator will be available shortly, and requesting additional information as a function of the responsive text message. By soliciting further information via text for an emergency call, additional details may be gathered without requiring input by the human call taker. That additional information can then be presented to the human call taker when the call is processed by the human call taker.

In block 335, for each verified non-emergency call, causing a follow-up text message to be transmitted to each verified non-emergency call indicating that the verified non-emergency call has been, is being, or will be disconnected and returned at a later time, and subsequently terminating, by the call routing computing device, the verified non-emergency call. Because there is not a time critical factor in responding to a non-emergency call, in some implementations, when a text based call is determined to not be an emergency call, a text message may be sent to the caller indicating that they will receive a return call once the PSAP is no longer in an overload condition.

It should be noted that for non-emergency calls, the identified subject matter of each verified non-emergency call may be provided to a supervisory dashboard computing device, for display to a supervisor. The supervisor may then review the decisions of the bot to determine if those decisions are correct. As explained above, the supervisor may decide to override any decision made by the bot (e.g. determine a non-emergency call is actually an emergency call).

In addition, metadata for each terminated non-emergency call may be stored, and responsive to detecting that the overload state has passed, the metadata may be routed to a human operator at a call taking electronic computing device for callback. As explained above, storing this data may allow a human call taker to understand what has previously occurred with the non-emergency call (e.g. what has been previously exchanged via text message with the non-emergency caller).

In some cases, the follow-up text message includes, as a function of one or both of electronically detected incoming emergency call volume and electronically determined available call taking staff, an estimated time that the verified non-emergency call will be returned. In this way, the caller knows when they can expect to receive a call back from the PSAP. In addition, a caller identifier of the text message is set to identify a jurisdiction of the PSAP and identify a source of the message as a PSAP. Including such information in the caller identifier information may be done whenever a text message is sent to the caller in order for the caller to understand that the text is coming from a legitimate PSAP. Such identification may cause the caller to pay attention to the incoming text, as opposed to dismissing it as an unwanted text message (e.g. spam, etc.).

In block 340, the call routing computing device may detect that the overload state has ended, and responsively refraining from transmitting further text messages to subsequently received new emergency calls. The same criteria that was used to determine if the PSAP is in an overload situation (e.g. call volume, staffing, etc.) may also be used to determine if the PSAP is no longer in an overload state, and the overload state has ended.

In block 345, if it is determined that the overload state has ended, the process returns to block 305, in which all new incoming calls are routed to a queue to be handled by human call takers. If it is determined in block 345 that the overload state continues, the process returns to block 320, wherein some calls are handled by human call takers and some calls are handled via bots responding via text message.

Figure 4:
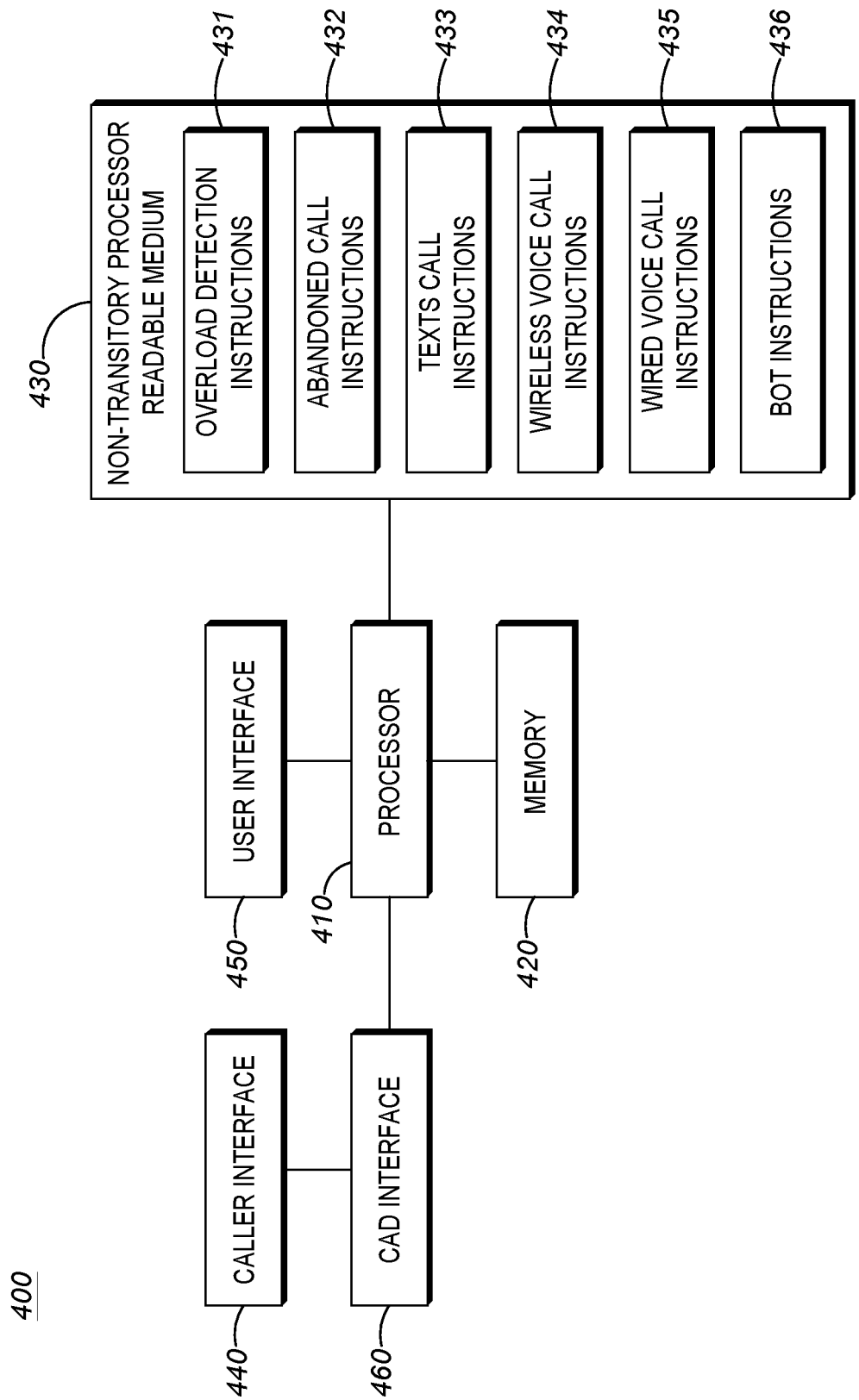
FIG. 4 is an example of a device that may be used to implement the call overload handling techniques described herein.

FIG. 4 is an example of a device that may be used to implement the call overload handling techniques described herein. For example, the device shown in FIG. 4 may be used to implement any or all of the functionality described with respect to call routing device 131, call taking device 132, triage bot device 136, and supervisor device 140. It should be understood that FIG. 4 represents one example implementation of a computing device that utilizes the techniques described herein. Although only a single processor is shown, it would be readily understood that a person of skill in the art would recognize that distributed implementations are also possible. For example, the various pieces of functionality described above (e.g. overload determination, bot responses, supervisor review, etc.) could be implemented on multiple devices that are communicatively coupled. FIG. 4 is not intended to imply that all the functionality described above must be implemented on a single device.

Device 400 may include processor 410, memory 420, non-transitory processor readable medium 430, caller interface 440, user interface 450, and CAD interface 460, intangible transactions database 470, and checkout systems interface 480.

Processor 410 may be coupled to memory 420. Memory 420 may store a set of instructions that when executed by processor 410 cause processor 410 to implement the techniques described herein. Processor 410 may cause memory 420 to load a set of processor executable instructions from non-transitory processor readable medium 430. Non-transitory processor readable medium 430 may contain a set of instructions thereon that when executed by processor 410 cause the processor to implement the various techniques described herein.

For example, medium 430 may include overload detection instructions 431. The overload detection instructions 431 may cause the processor to monitor the PSAP to determine if an overload condition exists. For example, the processor may utilize the caller interface 440 to determine how many calls are being received by the PSAP. The overload detection instructions may also monitor the user interface 450 to determine how many call takers are currently available to process calls. These instructions may allow the processor to determine if an overload condition exists within the PSAP. The overload detection instructions 431 are described throughout this description generally, including places such as the description of blocks 205, 210, 305, 310, 340, and 345.

Medium 430 may also include abandoned call instructions 432. The abandoned call instructions 432 may cause the processor to monitor for abandoned calls and schedule either automated or human based follow up based on overload status. Based on if the calling device is capable of receiving text messages, if a human call taker is available, the processor may determine if an abandoned call should be followed up using the bot or by adding the call to a human call takers queue. The abandoned call instructions 432 are described throughout this description generally, including places such as the description of blocks 220-235.

Medium 430 may also include text call instructions 433. Text call instructions 433 may cause the processor to determine if text based calls, during an overload condition, should be processed by the bot answering the text based calls. For example, the bot may respond to text based calls and request additional information to determine if the calls are emergency calls or not. Text call instructions 433 are described throughout this description generally, including places such as the description of blocks 240, 245, and 320-335.

Medium 430 may also include wireless voice call instructions 434. The wireless voice call instructions 434 may cause the processor to determine if voice based calls made from devices capable of text calls (e.g. wireless devices), during an overload condition should be processed by the bot using text and/or voice communications. For example, to the voice based call and respond with a text based message and/or a voice based instruction for the caller to remain on the line. Voice call instructions 434 are described throughout this description generally, including places such as the description of blocks 255 and 260.

Medium 430 may also include wired voice call instructions 435. Wired voice call instructions 435 may cause the processor to process voice calls from wired devices (e.g. devices not capable of sending text messages) via a human call taker queue. In some cases, the overload condition may be so severe that wired voice calls may be directed to the bot to be processed via a text to speech system to output speech the caller and to listen to the voice responses of the wired caller. Voice call instructions are described throughout this description generally, including places such as the description of blocks 265 and 270.

Medium 430 may also include bot instructions 436. The bot instructions 436 may cause the processor to implement a bot that performs the automated responses described. For example, the instructions may cause the bot to receive incoming calls, both text and voice, based on the level of overload. The bot may then make decisions on routing the call to a human call taker or automatically initiating a response. For example, if automatically initiating a response, the bot may utilize CAD interface 460 to cause an incident to be created in a CAD system and to cause first responders to be dispatched to the incident. The bot instructions 436 are described throughout this description generally, including places such as the description of blocks 250, 275, 280, and 320-335.

As should be apparent from this detailed description, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot [include a particular function/feature from current spec], among other features and functions set forth herein).

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for handling an overload state in a public safety answering point (PSAP), the method comprising:
   while an overload state is not detected at a call routing computing device, queueing, by the call routing computing device, received emergency calls for answer by human operators at call taking electronic computing devices;

responsive to detecting, by the call routing computing device, the overload state as a function of one or more of electronically detected incoming emergency call volume, incident volume, and electronically determined available call taking staff:
  first identifying, by the call routing computing device, those queued emergency calls initiated from mobile devices capable of communicating via text message and, for those identified queued emergency calls, transmitting a text message requesting callers that initiated the call from the mobile devices capable of communicating via text message to respond via responsive text message identifying the public safety subject matter of the emergency call;
  processing, by the call routing computing device, one or more received responsive text messages and classifying each responsive text message and its associated queued emergency call, as a function of the identified public safety subject matter, as one of a verified emergency call that should continue to queue for a human operator at a call taking electronic computing device and a verified non-emergency call that can be returned when the overload state is no longer detected, wherein verified emergency calls are identified via the identified subject matter as including keywords associated with life-threatening calls and non-emergency calls are identified via the identified subject matter as including keywords associated with non-life-threatening calls;
  for each verified emergency call, continuing to queue, by the call routing computing device, each verified emergency call for answer by a human operator at a call taking electronic computing device; and
  for each verified non-emergency call, causing a follow-up text message to be transmitted to each verified non-emergency call indicating that the verified non-emergency call has been, is being, or will be disconnected and returned at a later time, and subsequently terminating, by the call routing computing device, the verified non-emergency call.

2. The method of claim 1, wherein the follow-up text message includes, as a function of one or both of electronically detected incoming emergency call volume and electronically determined available call taking staff, an estimated time that the verified non-emergency call will be returned.

3. The method of claim 1, the method further comprising detecting, by the call routing computing device, that the overload state has ended, and responsively refraining from transmitting further text messages to subsequently received new emergency calls.

4. The method of claim 1, wherein the call routing computing device first identifies those queued emergency calls initiated from mobile devices that have initiated the emergency call via text message, and only after one of i) determining that a number of the mobile devices that have initiated the emergency call via text message would be insufficient to resolve the overload state and ii) classifying those queued emergency calls initiated from mobile devices that have initiated the emergency call via text message as verified emergency and non-emergency calls and determining that a number of verified non-emergency calls from mobile devices that have initiated the emergency call via text message would be insufficient to resolve the overload state, proceeding to identify those queued emergency calls initiated from mobile devices that have initiated the emergency call via voice but have a determined capability to support text message.

5. The method of claim 1, wherein a caller identifier of the text message is set to identify a jurisdiction of the PSAP and identify a source of the message as a PSAP.

6. The method of claim 1, wherein when the verified emergency call is answered by the human operator at the call taking electronic computing device, the identified subject matter of the call is provided to the human operator via the call taking electronic computing device.

7. The method of claim 1, further comprising providing, to a supervisory dashboard computing device, the identified subject matter of each verified non-emergency call for display to a supervisor.

8. The method of claim 1, further comprising, for each mobile device that has initiated the emergency call via voice but has a determined capability to support text messaging, providing, via the voice link, an audio instruction to keep holding for a human operator while the text message is transmitted.

9. The method of claim 1, further comprising, for those verified emergency calls, transmitting a second text message indicating that a human operator will be available shortly, and requesting additional information as a function of the responsive text message.

10. The method of claim 1, further comprising, storing metadata for each terminated non-emergency call, and responsive to detecting that the overload state has passed, routing the metadata to a human operator at a call taking electronic computing device for callback.

11. A call routing computing device for handling an overload state in a public safety answering point (PSAP), the call routing computing device comprising:
  a processor; and
  a memory coupled to the processor, the memory containing a set of instructions thereon that when executed by the processor cause the processor to:
    while an overload state is not detected at the call routing computing device, queue, by the call routing computing device, received emergency calls for answer by human operators at call taking electronic computing devices;
    responsive to detecting, by the call routing computing device, the overload state as a function of one or more of electronically detected incoming emergency call volume, incident volume, and electronically determined available call taking staff:
      first identify, by the call routing computing device, those queued emergency calls initiated from mobile devices capable of communicating via text message and, for those identified queued emergency calls, transmit a text message requesting callers that initiated the call from the mobile devices capable of communicating via text message to respond via responsive text message identifying the public safety subject matter of the emergency call;
      process, by the call routing computing device, one or more received responsive text messages and classifying each responsive text message and its associated queued emergency call, as a function of the identified public safety subject matter, as one of a verified emergency call that should continue to queue for a human operator at a call taking electronic computing device and a verified non-emergency call that can be returned when the overload state is no longer detected, wherein verified emergency calls are identified via the identified subject matter as including keywords associated with life-threatening calls and non-emergency calls are identified via the identified subject matter as including keywords associated with non-life-threatening calls;

for each verified emergency call, continue to queue, by the call routing computing device, each verified emergency call for answer by a human operator at a call taking electronic computing device; and for each verified non-emergency call, cause a follow-up text message to be transmitted to each verified non-emergency call indicating that the verified non-emergency call has been, is being, or will be disconnected and returned at a later time, and subsequently terminate, by the call routing computing device, the verified non-emergency call.

12. The device of claim 11, wherein the follow-up text message includes, as a function of one or both of electronically detected incoming emergency call volume and electronically determined available call taking staff, an estimated time that the verified non-emergency call will be returned.

13. The device of claim 11, the instructions further comprising instructions to detect, by the call routing computing device, that the overload state has ended, and responsively refraining from transmitting further text messages to subsequently received new emergency calls.

14. The device of claim 11, wherein the call routing computing device further comprises instructions to first identify those queued emergency calls initiated from mobile devices that have initiated the emergency call via text message, and only after one of i) determining that a number of the mobile devices that have initiated the emergency call via text message would be insufficient to resolve the overload state and ii) classifying those queued emergency calls initiated from mobile devices that have initiated the emergency call via text message as verified emergency and non-emergency calls and determining that a number of verified non-emergency calls from mobile devices that have initiated the emergency call via text message would be insufficient to resolve the overload state, proceed to identify those queued emergency calls initiated from mobile devices that have initiated the emergency call via voice but have a determined capability to support text message.

15. A non-transitory processor readable medium containing a set of instructions thereon that when executed by a processor of a call routing computing device cause the processor to:

while an overload state is not detected at the call routing computing device, queue, by the call routing computing device, received emergency calls for answer by human operators at call taking electronic computing devices;

responsive to detecting, by the call routing computing device, the overload state as a function of one or more of electronically detected incoming emergency call volume, incident volume, and electronically determined available call taking staff:

first identify, by the call routing computing device, those queued emergency calls initiated from mobile devices capable of communicating via text message and, for those identified queued emergency calls, transmit a text message requesting callers that initiated the call from the mobile devices capable of communicating via text message to respond via responsive text message identifying the public safety subject matter of the emergency call;

process, by the call routing computing device, one or more received responsive text messages and classifying each responsive text message and its associated queued emergency call, as a function of the identified public safety subject matter, as one of a verified emergency call that should continue to queue for a human operator at a call taking electronic computing device and a verified non-emergency call that can be returned when the overload state is no longer detected, wherein verified emergency calls are identified via the identified subject matter as including keywords associated with life-threatening calls and non-emergency calls are identified via the identified subject matter as including keywords associated with non-life-threatening calls;

for each verified emergency call, continue to queue, by the call routing computing device, each verified emergency call for answer by a human operator at a call taking electronic computing device; and for each verified non-emergency call, cause a follow-up text message to be transmitted to each verified non-emergency call indicating that the verified non-emergency call has been, is being, or will be disconnected and returned at a later time, and subsequently terminate, by the call routing computing device, the verified non-emergency call.

16. The medium of claim 15, wherein the follow-up text message includes, as a function of one or both of electronically detected incoming emergency call volume and electronically determined available call taking staff, an estimated time that the verified non-emergency call will be returned.

17. The medium of claim 15, the instructions further comprising instructions to detect, by the call routing computing device, that the overload state has ended, and responsively refraining from transmitting further text messages to subsequently received new emergency calls.

18. The medium of claim 15, wherein the call routing computing device further comprises instructions to first identify those queued emergency calls initiated from mobile devices that have initiated the emergency call via text message, and only after one of i) determining that a number of the mobile devices that have initiated the emergency call via text message would be insufficient to resolve the overload state and ii) classifying those queued emergency calls initiated from mobile devices that have initiated the emergency call via text message as verified emergency and non-emergency calls and determining that a number of verified non-emergency calls from mobile devices that have initiated the emergency call via text message would be insufficient to resolve the overload state, proceed to identify those queued emergency calls initiated from mobile devices that have initiated the emergency call via voice but have a determined capability to support text message.

* * * * *